T. LEININGER.
Apparatus for Watering Cattle.
No. 222,916.               Patented Dec. 23, 1879.
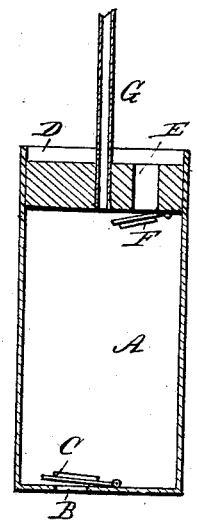
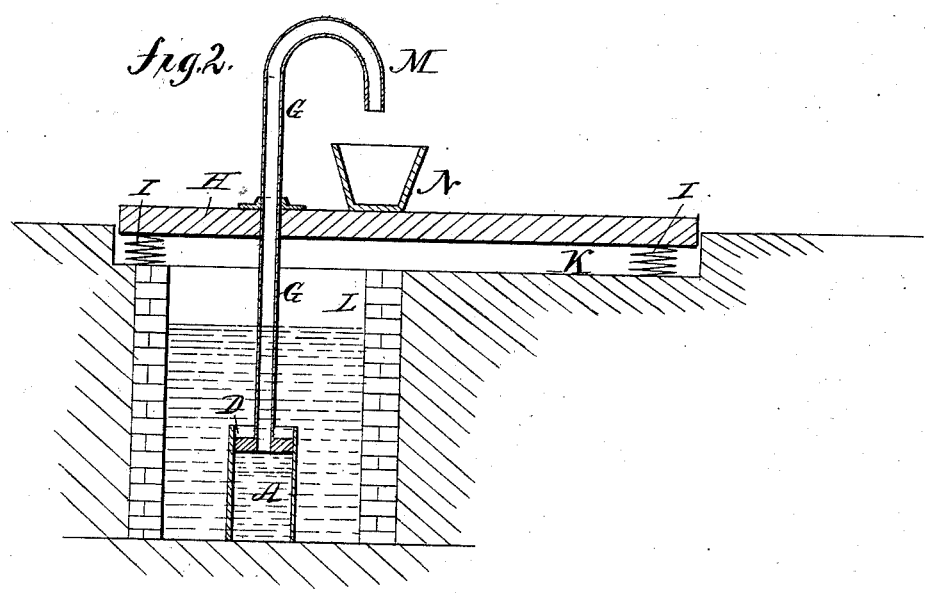

UNITED STATES PATENT OFFICE.

THEOBALD LEININGER, OF WASHINGTON TOWNSHIP, MERCER COUNTY, OHIO.

IMPROVEMENT IN APPARATUS FOR WATERING CATTLE.

Specification forming part of Letters Patent No. 222,916, dated December 23, 1879; application filed November 25, 1879.

*To all whom it may concern:*

Be it known that I, THEOBALD LEININGER, of Washington township, in the county of Mercer and State of Ohio, have invented certain new and useful Improvements in Apparatus for Watering Cattle; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in apparatus for supplying water to cattle and other animals; and it has for its object to provide a means for automatically elevating the water from a well or cistern and discharging it in suitable quantities into a watering-trough by the weight of the animal or animals.

To this end the invention consists of a submerged pump provided with a suitable induction valve or valves, and with a piston having a hollow piston-rod extending upward through a platform supported on springs, the said piston-rod being rigidly connected with said platform, and bent at its upper end to form a discharge-spout through which the water may be ejected into the watering-trough, as more fully hereinafter specified.

In the drawings, Figure 1 represents a vertical section of my improved pump; and Fig. 2, a vertical sectional view, showing a well or cistern with the pump submerged therein, and the platform through which the piston-rod passes.

The letter A indicates a pump-chamber, which may be of any shape and capacity, and may be constructed of any suitable material. The said chamber is provided with a valve-aperture, B, at its lower end, and with an inwardly-opening valve, C.

The letter D indicates the piston, which is provided with an opening, E, and inwardly-opening valve F. From said piston extends upwardly a hollow piston-rod, G, which passes through and is connected to a platform, H, which is supported upon springs I, in a suitable recess, K, sunk in the ground at the mouth of the well or cistern L. The upper end of the piston-rod is bent, forming a discharge-spout, M, which terminates over the watering-trough N.

The operation of my invention is as follows: The piston, piston-rod, and platform are held in a normal position by the springs I, the pump-cylinder, while the parts are in this position, being filled with water, which enters through the valve-openings. When the platform is depressed by the weight of the cattle or other animals coming to water, the water will be forced up through the hollow piston-rod and discharged in proper quantities into the watering-trough.

It is evident that my invention can be applied to other purposes than watering cattle—as, for instance, to domestic and all industrial uses, where the water may be raised by means of the weight of the person desiring to draw the same in similar manner.

Having described my invention, what I claim is—

1. An apparatus for elevating water, consisting in the combination, with a submerged pump provided with suitable induction-valves, of a hollow piston-rod connected with the piston thereof, and a platform supported on springs and connected with the piston-rod, whereby the weight of the cattle or other animals will elevate the water, substantially as specified.

2. The combination of the submerged pump A, opening B, and valve C, the piston D, with opening E and valve F, the hollow piston-rod G and platform H, and the springs I, upon which said platform is mounted, the piston-rod being secured to the platform H, so as to be operated thereby when depressed by the weight of the cattle, substantially as specified.

In testimony that I claim the foregoing I have hereunto set my hand this 24th day of November, 1879.

THEOBALD LEININGER.

Witnesses:
CHAS. L. COOMBS,
H. J. ENNIS.